United States Patent
Rasmussen

(10) Patent No.: US 8,066,924 B2
(45) Date of Patent: Nov. 29, 2011

(54) METHOD OF MANUFACTURING AN ALLOYED FILM AND APPARATUS FOR THE METHOD

(76) Inventor: Ole-Bendt Rasmussen, Walchwil (CH)

( * ) Notice: Subject to any disclaimer, the term of this patent is extended or adjusted under 35 U.S.C. 154(b) by 619 days.

(21) Appl. No.: 11/666,140

(22) PCT Filed: Nov. 3, 2005

(86) PCT No.: PCT/EP2005/012184
§ 371 (c)(1),
(2), (4) Date: Apr. 23, 2007

(87) PCT Pub. No.: WO2006/048335
PCT Pub. Date: May 11, 2006

(65) Prior Publication Data
US 2007/0290416 A1    Dec. 20, 2007

(30) Foreign Application Priority Data

Nov. 3, 2004  (GB) .................................. 0424355.6

(51) Int. Cl.
*D01D 5/12* (2006.01)

(52) U.S. Cl. ............... 264/210.1; 264/171.1; 425/131.1; 425/197; 425/199

(58) Field of Classification Search ............... 264/171.1, 264/210.1, 210.7, 555; 425/66, 131.1, 197, 425/199, 325, 382.4; 428/300.7
See application file for complete search history.

(56) References Cited

U.S. PATENT DOCUMENTS

| | | | | |
|---|---|---|---|---|
| 2,262,989 A | * | 11/1941 | Conklin et al. | 264/175 |
| 3,511,742 A | * | 5/1970 | Rasmussen | 428/338 |
| 3,609,806 A | * | 10/1971 | Schippers et al. | 425/197 |
| 3,863,001 A | * | 1/1975 | Thumudo, Jr. | 264/148 |
| 3,954,933 A |   | 5/1976 | Rasmussen | |

(Continued)

OTHER PUBLICATIONS

Rosato, Dominick, "Plastics Processing Data Handbook (2nd Edition)", Springer-Verlag, 1997.*

*Primary Examiner* — Richard Crispino
*Assistant Examiner* — Elizabeth Royston
(74) *Attorney, Agent, or Firm* — Robert W Strozier

(57) ABSTRACT

A method and apparatus for carrying out the method are for forming a sheet or film of thermoplastic polymer alloy by extruding an intimate blend of incompatible polymer materials, such as polypropylene dispersed in LLDPF, through an extruding die and stretching after extrusion. In the die upstream from the exit is a grid chamber comprising one or more grids, the grid or grids having at least 4 (in the longitudinal sections perpendicular to the main surfaces of the flow) closely spaced lamellae (303) having walls extending several millimeters in the direction of the flow which are interconnected (306) at intervals such that viewed in sections perpendicular to the direction of flow they form a network, the intervals being essentially longer than the distance between each pair of lamellae and between the lamellae apertures of a size selected to reduce the average size of the dispersed phase of P1 or P2 in the blend, the grid or grids being located at a position in the chamber where the gap is wider than the said exit gap, the grip chamber further comprising a gap reduction portion between the screen and the die exit wherein the gap through which the blend flows is reduced at least part way to the gap of the die exit. There may be two grids with parallel lamellae arranged so that the lamellae of the downstream grid are located mid-way between the lamellae of the upstream grid.

22 Claims, 1 Drawing Sheet

U.S. PATENT DOCUMENTS

| | | | | |
|---|---|---|---|---|
| 4,039,364 | A | 8/1977 | Rasmussen | |
| 4,084,028 | A | 4/1978 | Rasmussen | |
| 4,115,502 | A | 9/1978 | Rasmussen | |
| 4,125,581 | A | 11/1978 | Rasmussen | |
| 4,143,195 | A | 3/1979 | Rasmussen | |
| 4,207,045 | A | 6/1980 | Rasmussen | |
| 4,229,394 | A | 10/1980 | Rasmussen | |
| 4,293,294 | A | 10/1981 | Rasmussen | |
| 4,294,638 | A | 10/1981 | Rasmussen | |
| 4,368,017 | A | 1/1983 | Rasmussen | |
| 4,377,544 | A | 3/1983 | Rasmussen | |
| 4,403,934 | A | 9/1983 | Rasmussen | |
| 4,407,877 | A | 10/1983 | Rasmussen | |
| 4,420,451 | A | 12/1983 | Rasmussen | |
| 4,421,810 | A | 12/1983 | Rasmussen | |
| 4,422,837 | A | 12/1983 | Rasmussen | |
| 4,430,284 | A | 2/1984 | Rasmussen | |
| 4,436,568 | A | 3/1984 | Rasmussen | |
| 4,440,709 | A | 4/1984 | Rasmussen | |
| 4,465,724 | A | 8/1984 | Rasmussen | |
| 4,478,516 | A * | 10/1984 | Kessler | 366/87 |
| 4,492,549 | A | 1/1985 | Rasmussen | |
| 4,629,525 | A | 12/1986 | Rasmussen | |
| 4,636,417 | A | 1/1987 | Rasmussen | |
| 4,767,488 | A | 8/1988 | Rasmussen | |
| 4,793,885 | A | 12/1988 | Rasmussen | |
| 4,874,653 | A | 10/1989 | Rasmussen | |
| 4,908,253 | A | 3/1990 | Rasmussen | |
| 5,028,289 | A | 7/1991 | Rasmussen | |
| 5,079,051 | A * | 1/1992 | Garland et al. | 428/34.9 |
| 5,205,650 | A | 4/1993 | Rasmussen | |
| 5,248,366 | A | 9/1993 | Rasmussen | |
| 5,330,133 | A | 7/1994 | Rasmussen | |
| 5,361,469 | A | 11/1994 | Rasmussen | |
| 5,626,944 | A | 5/1997 | Rasmussen | |
| 6,344,258 | B1 | 2/2002 | Rasmussen | |
| 6,787,206 | B2 | 9/2004 | Rasmussen | |
| 6,887,503 | B1 | 5/2005 | Rasmussen | |
| 7,001,547 | B2 | 2/2006 | Rasmussen | |
| 7,132,151 | B2 | 11/2006 | Rasmussen | |
| 2004/0070105 | A1 | 4/2004 | Rasmussen | |
| 2004/0247730 | A1 | 12/2004 | Rasmussen | |
| 2005/0095411 | A1 | 5/2005 | Rasmussen | |
| 2005/0118304 | A1 | 6/2005 | Rasmussen | |
| 2007/0082188 | A1 | 4/2007 | Rasmussen | |
| 2007/0254120 | A1 | 11/2007 | Rasmussen | |
| 2007/0257402 | A1 | 11/2007 | Rasmussen | |
| 2007/0290416 | A1 | 12/2007 | Rasmussen | |
| 2008/0035714 | A1 | 2/2008 | Rasmussen | |
| 2009/0206510 | A1 | 8/2009 | Rasmussen | |
| 2009/0233041 | A1 | 9/2009 | Rasmussen | |

* cited by examiner

METHOD OF MANUFACTURING AN ALLOYED FILM AND APPARATUS FOR THE METHOD

RELATED APPLICATIONS

The co-pending International Patent Application WO-A-2004094129 comprises a method of manufacturing an alloyed film consisting of flat micro-fibrils of one or more polymer materials (P1) occluded in, as a matrix material, another polymer material (P2). A high degree of flatness of the fibrils in such morphology, i.e. average ratio between width and thickness, is of high importance for several purposes, especially when the aim is to achieve high barrier properties and the polymer or polymers P1 are selected for this purpose. However, a high degree of fibril flatness can also be important for several other purposes, which shall be dealt with below.

The present application is a 35 U.S.C. §371 nationalization of PCT/EP05/121184, which claim prior to GB0424355.3.

BACKGROUND OF THE INVENTION

1. Field of the Invention

The present invention relates to a method and apparatus for extruding polymer alloys including a first and second polymer material.

More particularly, the present invention relates to a method and apparatus for extruding polymer alloys including a first polymer material and second polymer material, where the method includes the step of extruding the materials in a specially designed extrusion die apparatus.

2. Description of the Related Art

The relevant method described and claimed in the above-mentioned co-pending International Patent Application comprises the steps of a method of forming a film or sheet of thermoplastic polymer alloy in which there is formed an intimate blend of polymer material P1 and polymer material P2, the blend is extruded through a die and the extruded film is stretched after extrusion, in which the flow passage through the die comprises an exit orifice having an exit gap, characterised in that upstream from the exit orifice there is provided a grid chamber comprising one or more grids through which the blend passes, the grid or grids having at least 4 (in the longitudinal sections perpendicular to the main surfaces of the flow) closely spaced lamellae having walls extending several millimeters in the direction of the flow and between the lamellae apertures of a size selected to reduce the average size of the dispersed phase of P1' or P2' in the blend, the grid or grids being located at a position in the chamber where the gap is wider than the said exit gap, the grid chamber further comprising a gap reduction portion between the screen and the die exit wherein the gap through which the blend flows is reduced at least part way to the gap of the die exit.

SUMMARY OF THE INVENTION

The present invention is similarly characterized, but further characterized in that said lamellae are interconnected at intervals such that viewed in sections perpendicular to the direction of flow they form a network, the intervals being essentially longer than the distance between each pair of lamellae.

The present patent application has been filed prior to the publication of the above-mentioned International Patent Application.

The invention can be used for extrusion of flat as well as tubular film.

BRIEF DESCRIPTION OF THE DRAWINGS

The invention shall now be explained in further detail with reference to the drawings.

Figure 1A:
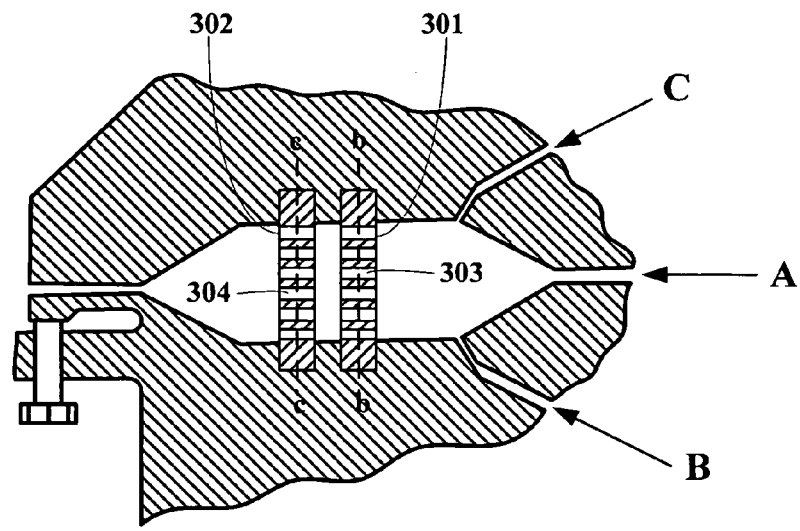
FIG. 1a shows the exit of a co-extrusion die according to the invention, which may be flat or circular, supplied with two grid-formed screens for the purpose of making the fibrillar dispersion finer and the fibrils pronouncedly flat. The sketch represents a section through a-a in FIG. 1b.

An appropriate scale is shown on the sheet of drawings.

DETAILED DESCRIPTION OF THE INVENTION

The passage of the flow of polymer-in-polymer dispersion between the array of lamellae in a grid divides the flow into flat, ribbon formed sub-flows, which unite again to one flow at the exit from the array of lamellae. During the passage between each pair of lamellae the particles of P1, which are occluded in P2, will become sheared out to flat structures, which are highly elongated in the direction of flow, in other words to flat fibrils. In this respect each pair of lamellae acts similar to a narrow exit slot in a flat or annual extrusion die. There are two advantages of using the described grid-chamber instead of simply extruding the polymer dispersion out of a very narrow exit orifice, whereby it is essential that each grid comprises at least 4 lamellae when viewed in a section parallel with the flow and perpendicular to the main boundaries of the flow, and which therefore in the same view divides the flow into at least 4 sub-flows. One advantage is that by use of such a grid chamber, in comparison with an exit orifice of normal, bigger gap, the back-pressure can be much lower for a given throughput. The other advantage is that, in addition to the flattening which takes place while the sub-flows pass the lamellae, the fibrils are also essentially flattened after the grid or grids when the chamber narrows down towards at the exit of the die.

The use of a conventional screen at the end of an extrusion die is known, see e.g. JP-A-85-110422, but does not help to increase the flatness of the particles in a passing polymer-in-polymer dispersion.

The special advantage of having the lamellae interconnected at intervals (which, in order not to disturb the desired morphology, are essentially longer than the distance between each pair of lamellae) is the mechanical stabilisation. Thereby the thickness of the lamellae e.g. down to 0.5 mm or perhaps lower than this, and spacing between the latter can be made smaller, and/or the grid-chamber can be made higher, such that the number of lamellae (viewed in a section parallel with the flow and perpendicular to the boundaries of the flow) can be optimised for the purpose of optimising the flatness of the fibrils.

Preferably the intervals between the connections between the lamellae are at least 2 times, more preferably at least 3 times, and still more preferably between about 5 and 10 times as long as the distance between each pair or lamellae.

In one embodiment of the invention the lamellae are flat or slightly curved and are slanted in relation to the main boundaries of the flow as this enters the grid, forming angles between about 10 to about 70 degrees with these boundaries. Preferably there are at least two such grids in series which are slanted in mutually different. directions.

In another embodiment of the invention the lamellae are parallel with the main boundaries of the flow as this enters the grid and the connections on opposite sides of each lamella are mutually displaced.

Interconnections link adjacent lamellae and preferably extend the entire thickness (e.g. 5-10 mm) of the grid in order to create hollow channels through the grid running parallel to the flow of the polymer. In an alternative embodiment of the invention the interconnections do not extend the entire thickness of the grid and are merely provided at the upstream or downstream ends of the grid, or in between these ends.

The grid can be manufactured by spark erosion of a metal sheet whereby the channels in between the lamellae and interconnecting units are removed from the sheet using electrical discharge. An alternative method of manufacture welds thin (e.g. less than 1 mm) plates comprising cross sections of the grid perpendicular to the main boundaries of flow, together with spacers to form a three-dimensional grid of desired thickness. The spacers may be welded to the plates, for example, only at the upstream or downstream ends of the grid or along its entire thickness to form complete channels.

The morphology of the extruded, and optionally further oriented film with highly attenuated, very flat micro-fibrils, can provide cross laminates and slit film products with improved strength properties. Furthermore it can be used to manufacture films with a fine cellular, expanded structure. Finely extended, very flat polypropylene microfibrils, alloyed into a film of linear low density polyethylene (LLDPE) can render a film highly oil resistant, while very flat polyamide microfibrils, also alloyed with LLDPE can do the same and further provide good barrier properties against oxygen. For manufacture of a barrier film, the flat microfibrils can alternatively consist e.g. of EVOH or vinylidene co-polymers.

It is of course important to control that the polymer, which due to its mechanical properties, barrier properties or other special properties is selected to be the P1 component, i.e. to form the flat, occluded fibrils (including fibril networks), actually becomes the P1 component and does not become the matrix material. In this connection the following guidelines can be given.

The lower the concentration of P1, the higher the probability that it will become the occluded phase (when other features are not changed).

The higher the melt viscosity of P1 is as compared to P2—under the given conditions of melt attenuation—the higher the probability that P1 becomes the occluded phase (when other features are not changed). It is hereby noted that P1 undergoes an increase in melt viscosity near to its point of solidification, and the inventor has established some evidence indicating that slow cooling may convert a P2-in-P1 dispersion into a P1-in-P2 dispersion. It is also likely that such conversion can take place during the crystallization of P1. Preferably the weight proportion of P1 in the mixture is less than 75%, more preferably in the range 5 to 60%, for instance in the range 10 to 60%, most preferably in the range 20 to 50%.

However, when it is feasible it is advisable to obtain the P1-in-P2 occlusion by use of relatively high molecular weights for the polymer of P1 to give it a suitably high melt viscosity (e.g. a melt flow index of at least 0.1, preferably about 0.5), or by the use of relatively low concentrations of this component, then solidify both components by a quick cooling (as further described in WO-A-02/051617 so that the melt-attenuated structure becomes fixed, since a slow cooling seems to produce fibrils of more irregular shape and therefore of lower strength.

The lamellae will produce so-called "die-lines" in the final film. In case the lamellae are parallel with the main boundaries of the grid chamber, the die-lines will be parallel with the major film surfaces, and if the lamellae are slanted, die-lines will form a very small angle e.g. 1 degree or less, with the major film surfaces. During the passage of the sub-flows between the lamellae, the shear will be strongest in the immediate vicinity of each lamellae, and therefore the attenuation and flattening of the P1 fibrils is most pronounced in the die-lines. These die-lines therefore promote the effects of which the present invention claims, while a die-line in conventional extrusion technology is considered to be disadvantageous.

In order to promote the occurrence of such flat die-lines, an embodiment of the invention is characterised in that the grid chamber contains at least two grids S and T, S being directly upstream of T, and the grids are arranged such that each die-line in the flow formed by a lamella of grid S falls generally in the middle of the space between a pair or adjacent lamellae in grid T. The advantages of arranging the lamellae in this mutually displaced manner is not limited to lamellae supplied with interconnections, but similarly applies to lamellae without such interconnections, and is also considered an inventive improvement in that case. In that case the lamellae in grids S and T should be parallel with one another.

In this aspect there is provided a method of forming a film or sheet of thermoplastic polymer alloy in which there is formed an intimate blend of polymer material P1 and polymer material P2, the blend is extruded through a die and the extruded film is stretched after extrusion in which the flow passage through the die comprises an exit orifice having an exit gap, characterised in, that upstream from the exit orifice there is provided a grid chamber comprising one or more grids through which the blend passes, the grid or grids having at least 4 (in the longitudinal sections perpendicular to the main surfaces of the flow) closely spaced lamellae having walls extending several millimeters in the direction of the flow and, between the lamellae apertures of a size selected to reduce the average size of the dispersed phase of P1 or P2 in the blend, the grid or grids being located at a position in the chamber where the gap is wider than the said exit gap, the grid chamber further comprising a gap reduction portion between the screen and the die exit wherein the gap through which the blend flows is reduced at least part way to the gap of the die exit, further characterised in that the grid chamber contains at least two grids S and T, S being directly upstream of T, and the grids are arranged such that each die-line in the flow formed by a lamella of grid S falls generally in the middle of the space between a pair or adjacent lamellae in grid T. This forms a further aspect of the invention. In this aspect the lamellae may be flat or slightly curved. The lamellae of the two grids should be generally parallel with each other in order that the dielines are as described formed along the length of the lamellae. The extend of any stent is a) described in connection with the first aspect of the invention.

The die-lines which reflect the pattern of the grid or grids, but in a flattened form, can normally be detected in the final film, e.g. by treating a cross-section of the film with a solvent which dissolves P2 but not P1, and subsequently studying sections of the film in suitably high magnifications by scan electron microscopy. As an example, if P1 is polypropylene and P2 is LLDPE, 30 minutes treatment with xylene at 90° C. will develop the fibrillar structure which shows the die-lines.

The invention also comprises the apparatus suited for carrying out the described method in its different embodiments as defined in claims 16 to 25.

Apparatus suitable for carrying out the second aspect of the invention for extruding thermoplastic material to form a film or sheet comprises a die having an exit orifice through which the molten material flows and stretching means for stretching the material after it is extruded characterised in that there is provided a grid chamber upstream from the exit orifice comprising two or more grids through which the extrudate passes, the grid or grids being located at a position in the chamber where the gap is wider than said exit orifice gap, the grid chamber further comprising a gap reduction portion between the grid or grids and the die exit wherein the gap is reduced at least part way to the gap of the exit orifice and is further characterised in that the said at least two grids, S and T, S being directly upstream of T, are arranged such that each die-line in the flow formed by a lamella of grid S falls generally in the middle of the space between a pair or adjacent lamellae in grid T.

An embodiment of the invention is characterised by the following features: P1 and P2 are incompatible to such an extent that they exist as separate phases in the final film, but are compatibilised sufficiently for practical purposes either by use of an alloying agent or mechanically by sufficient mixing and attenuation, and P2 in its unoriented state at 20° C. exhibits a coefficient of elasticity (E) which is at least 15% lower than E of P1. Preferably but not necessarily the mechanically determined melting point of P1 is at least about 20° C. higher than that of P2. By adaptions of rheological conditions, percentages of the components, and conditions for mixing and attenuation, the alloy is formed substantially as a dispersion of microscopically fine fibrils or fibril network of P1 surrounded by P2, whereby each fibril extends mainly in one direction and generally has a thickness around or lower than 5 pm, preferably around or lower than 1 pm, and still more preferably around or lower than 0.1 pm and width at least 5 times its thickness, more preferable at least 10 times or even 20 times its thickness. Furthermore the film is preferably stretched after at least P1 has been solidified.

By a random blending technique (as the blending always will be carried out in practice) to form microscopically or submicroscopically fine fibrils of one polymer occluded in another polymer as matrix, it will always be impossible to give the fibrils cross sectional dimensions which are even along their width, since the fibrils disturb each other's regularity, except if their concentration in the matrix is very low. This and irregularities caused by the crystallisation of the very fine fibrils has a negative influence on the strength of the resultant film. However, in very flat fibrils these effects are to some extent evened out, especially when the alloy has been rapidly cooled, and therefore the present invention in itself presents an advantage relating to the strength of the produced film, and of tape or cross laminates made from this film.

In this use of the invention, a step of the stretching after solidification may be transverse to the direction of the fibrils. Preferably the film is then allowed to contract in the direction of the fibrils during this stretching. The possibilities for contraction can be established by a preceding fine transverse pleating of the film. This step of stretching transverse to the direction of the fibrils can also be preceded by stretching in the direction of the fibrils while the latter are solid.

As regards to the choice of polymers for this strength promoting use of the invention, P1 can e.g. consist of propylene polymers including crystalline copolymers of propylene or propylene homopolymer, or polyamide, or polyethylene terephthalate, and P2 can e.g. mainly consist of a propylene copolymer, or ethylene polymer including copolymers of ethylene, preferably with other alpha-olefins, P2 preferably comprising linear low density polyethylene.

In another embodiment of the invention, which has been mentioned above, P1 is chosen to exhibit desirable barrier properties. This use is further characterised by the following features:

P1 and P2 are incompatible to such an extent that they exist as separate phases in the final film, but are compatibilised sufficiently for practical purposes either by use of an alloying agent or mechanically by sufficient mixing and attenuation. By adaptions of rheological conditions, percentages of the components, and conditions for mixing and attenuation, the alloy is formed substantially as a dispersion of microscopically fine fibrils or fibril network of P1 surrounded by P2, whereby each fibril generally extends in one main direction and generally has a thickness around or lower than 5 pm, preferably around or lower than 1 pm, and a width at least 5 times its thickness, preferably 10 and more preferably at least 20 times its thickness.

It is well known that flake-shaped particles, e.g. mica powder exerts a barrier effect, since it forces the penetrating molecules of gas, aroma substance, or harming liquid to diffuse like in a labyrinth. However, such flake shaped particles will normally have a negative influence on the strength of the film unless its concentration and therefore effect is low. Normally barrier properties therefore are achieved by coextrusion, including optionally coextrusion of tie layers, together with the main layer of the film. When two heatseal layers also are required, the die must normally be constructed for no less than 6 layers, or in case 2 barrier layers are needed, for 9 layers. Such dies are commercially available but expensive. Under use of the invention, one, two or more barrier forming polymers, P1 a, P1 b etc, can be alloyed with the main polymer P2 without any use of the expensive tie-polymers. If special surface layers for heatsealing are not required this means that a simple 1-component die is sufficient when additionally supplied with the described grid chamber. If surface layers for heatsealing are required, a 3-layer coextrusion die is needed, but in any case the saving in investment is very important. The barrier effect may not be quite at high as achieved with the expensive dies, but good enough for many purposes. Examples of applicable barrier polymers:

Polypropylene or polyethylene terephthalate can protect cross laminates, which mainly are based on polyethylene, against destruction by oil; nylon 6 or 66 can do the same and also form a barrier against oxygen, while EVOH and copolymers of vinylidene chloride very efficiently can form a barrier against oxygen, oil and most aroma substances.

Finally, as already mentioned the method according to the second aspect of the invention can with advantage be used to make film with a fine cellular, expanded structure, especially for conversion to tape or cross laminates. This use is characterised by the following features: 20 P1 and P2 are incompatible to such an extent that they exist as separate phases in the final film, but are compatibilized sufficiently for practical purposes either by use of an alloying agent or mechanically by sufficient mixing and attenuation.

By adaptions of rheological conditions, percentages of the components, and conditions for mixing and attenuation the alloy is formed substantially as a dispersion of microscopically fine fibrils or fibril network of P1 surrounded by P2, whereby each fibril extends mainly in one direction and generally has a thickness around or lower than 5 pm, preferably around or lower than 1 pm and width at least 5 times its thickness, preferably at least 10 or even 20 times its 30 thickness. There is added an expansion agent prior to or during the extrusion, which agent is soluble in P2 but generally not in P1, whereby expansion is established after the extrusion step.

Since the expansion agent is generally not soluble in P1, the fibrils act as barriers to the expansion agent, thereby they strongly promote an efficient and fine expansion. The film (or tapes made by slitting of the film) may additionally be strongly oriented prior to, during, or after the expansion, and they may be converted to split fibre networks e.g. by rubbing action.

Figure 1C:
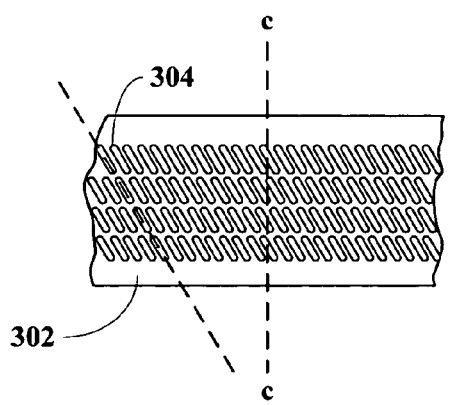
FIG. 1c shows a section through c-c in FIG. 1a. In the case of a circular die these Figures show folded-out circular sections.
Figure 1B:
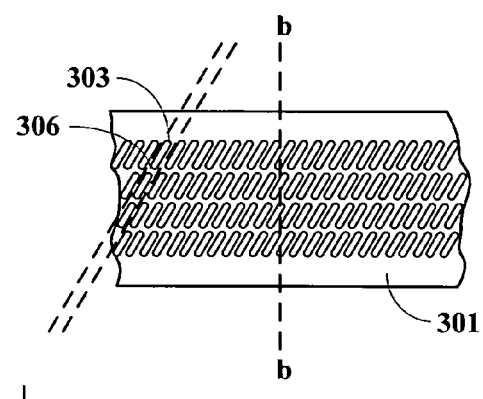
FIG. 1b shows a section through b-b in FIG. 1a, and similarly

In FIGS. 1 a, b and c the major flow in the die which comprises a dispersion of P1 in P2 expands, e.g. from a thickness of about 2.5 mm to a thickness of about 20 mm, and is then coextruded with two minor surface layers which are selected for instance for improvement of bonding, heat-seal properties and/or frictional properties.

The composite flow of the 3 layers in the 20 mm deep grid chamber passes the two grid-like screens (301) and (302), each a few mm thick (e.g. 5-10 mm) portions of which are shown in FIGS. 1 b and 1 c respectively. Each comprises an array of lamellae (303) and (304) each e.g. about 1 mm thick, and spaced e.g. about 1 mm from each other. The lamellae are joined by interconnections (306). Screens (301) and (302) are mirror images of each other so that the flow is sheared most efficiently as it passes.

Immediately following screen (302) the flow is compressed to a thickness, e.g. 2.5 mm which is convenient for its exit from the coextrusion die. Hereby the polymer-in-polymer dispersion becomes further attenuated to form the desired final cross-sectional dimensions of each fibril, and at the same time the die-lines formed by the lamellae (303) and (304) are flattened. With the mentioned dimensions in the die, and the shown angle of slanting of the lamellae, the die-lines and the flat fibrils will form an angle of about 8° to the main surfaces of the film at the exit from the die. The subsequent stretching processes will usually bring the angle down to around 1 or less. These die-lines can normally be detected in the final film, as explained in the foregoing, the pattern of die-lines in a cross-section of the film is a flattened picture of the grid.

Figure 2:
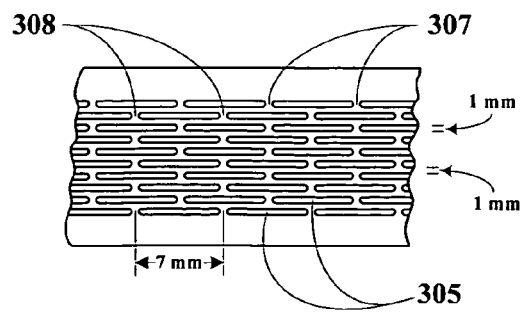
FIG. 2 shows an alternative pattern of the grid structure, likewise in a section perpendicular to the direction of flow.

In FIG. 2, the lamellae (305) are not slanted but parallel with the main surfaces of the chamber. The connections (307 and 308) between the lamellae are mutually displaced to avoid directly die-lines going through the film.

I claim:

1. A method of forming a thermoplastic film or sheet comprising the steps of:
    supplying at least a polymer material P1 and a polymer material P2 to a die, where the die comprises:
    inlets for the polymer materials P1 and P2,
    a chamber including:
        at least one screen (301, 302) positioned in the chamber perpendicular to a direction of flow, where each screen includes:
            flattened apertures sized to reduce an average size of a dispersed phase of the polymer material P1 or P2 in a blend of the polymer materials P1 and P2 and to form flattened fibrils of the dispersed phase in the blend, lamellae (303, 304, 305) interposed between adjacent apertures along their long sides, interconnections (306, 307, 308) portions interposed between adjacent apertures along their short sides, where intervals between interconnections between the lamellae are greater than a distance between each pair of where the apertures form a network of apertures having at least four lamellae interposed between apertures when viewed in cross-section,
        a gap reduction portion and
        an exit orifice having an exit gap,
            where the screens are located at a position in the chamber having a chamber gap wider than the exit gap, and where the gap reduction portion is disposed downstream of the screens and is adapted to dimensionally reduce the chamber gap to a dimension of the exit gap,
    extruding the blend of the polymer materials P1 and P2 through the chamber, the screens, the gap reduction portion and the exit orifice to form an extruded film having flattened fibrils of the dispersed phase in the blend, where each fibril extends substantially in one direction and where each fibril has a width and a thickness and the width is greater than the thickness, and
    stretching the extruded film to form a stretched film.

2. The method according to claim 1, wherein the intervals are at least 2 times greater than the distance between each pair of lamellae.

3. The method according to claim 1, wherein the lamellae are flat or curved and are slanted at an angle between about 10 to about 70 degrees in relation to main boundaries of the flow as the flow enters the screens.

4. The method according to claim 3, wherein the chamber further includes at least two screens slanted in mutually different directions.

5. The method according to claim 1, wherein the apertures are disposed in rows parallel to main boundaries of the flow as the flow enters the screens and where adjacent rows of apertures are mutually displaced.

6. The method according to claim 1, wherein the chamber further includes at least two screens S and T, where the screen S is disposed directly upstream of the screen T, the screens S and T being arranged such that each die-line in the flow formed by a lamellae of the screen S falls in a middle of a space between a pair of adjacent lamellae of the screen T.

7. The method according to claim 1, wherein the polymer material P1 is present in the blend in an amount of 5% to 75% by weight.

8. The method according to claim 1, wherein the polymer material P1 has a MFI of at least 0.1.

9. The method according to claim 1 wherein the polymer material P1 is selected from group consisting of propylene (co)polymers, polyamides, ethylene-vinyl alcohol copolymers, vinylidene (co)polymers and polyesters, and the polymer material P2 comprises olefin polymers.

10. The method according to claim 9, wherein the polymer material P2 is a propylene (co)polymer or an ethylene (co)polymer.

11. The method according to claim 1, wherein the polymer material P2, in its unoriented state at 20° C. and exhibits a coefficient of elasticity (E), which is at least 15% lower than a coefficient of elasticity of the polymer material P1.

12. The method according to claim 1, wherein at least one material is coextruded through the die on one or both surfaces of the film or sheet of the blend of polymer materials P1 and P2.

13. The method according to claim 12, wherein the at least one coextruded material forms a heat seal layer on one or each surface of the film or sheet.

14. The method according to claim 1, wherein the stretching of the film after extrusion is carried out after cooling the film to a temperature at which at least the polymer material P1 has solidified.

15. The method according to claim 14, wherein the stretching is transverse to a direction of fibrils formed in the polymer material P1 during extrusion.

16. The method according to claim 15, wherein the stretching is transverse to a direction of the fibrils of the polymer material P1 and occurs while the film is allowed to contract in a direction of the fibrils.

17. The method of claim 1, wherein the intervals are at least 3 times as long as the distance between each pair of lamellae.

18. The method of claim 1, wherein the intervals are at least 5 times as long as the distance between each pair of lamellae.

19. The method according to claim 1, wherein the polymer material P1 is present in the blend in an amount of 10% to 60% by weight.

20. The method according to claim 1, wherein the polymer material P1 is present in the blend in an amount of 20% to 50% by weight.

21. The method according to claim 1, wherein the polymer material P1 has a MFI of at least about 0.5.

22. A method of forming a thermoplastic film or sheet comprising the steps of:
supplying at least a polymer material P1 and a polymer material P2 to a die,
where the die comprises:
inlets for the polymer materials P1 and P2,
a chamber including:
at least two screens S and T (301 and 302) positioned in the chamber perpendicular to a direction of a flow so that the screen S is directly upstream of the screen T, where each screen includes:
flattened apertures sized to reduce an average size of a dispersed phase of the polymer material P1 or P2 in a blend of the polymer materials P1 and P2 and to form flattened fibrils of the dispersed phase in the blend,
separating portions (303,304,305) interposed between adjacent apertures along their long sides, interconnecting portions (306,307,308) interposed between adjacent apertures along their short sides, where intervals between interconnections between the lamellae are greater than a distance between each pair of lamellae, where the apertures form a network of apertures having at least four lamellae interposed between apertures when viewed in cross-section,
a gap reduction portion and
an exit orifice having an exit gap,
where the screens S and T are located at a position in the chamber having a chamber gap wider than the exit gap, and where the gap reduction portion is disposed downstream of the screens and is adapted to dimensionally reduce the chamber gap to a dimension of the exit gap and the screens S and T are arranged such that each die-line in the flow formed by the separating portions of the screen S falls substantially in a middle of a space between a pair of the separating portions of the screen T,
extruding the blend of the polymer materials P1 and P2 through the chamber, the screens, the gap reduction portion and the exit orifice to form an extruded film having flattened fibrils of the dispersed phase in the blend, where each fibril extends substantially in one direction and where each fibril has a width and a thickness and the width is greater than the thickness, and
stretching the extruded film after extrusion to form a stretched film.

* * * * *